US011443542B2

United States Patent
Chen et al.

(10) Patent No.: US 11,443,542 B2
(45) Date of Patent: Sep. 13, 2022

(54) FINGERPRINT RECOGNITION METHOD AND ELECTRONIC INTERACTIVE APPARATUS THEREOF

(71) Applicant: Industrial Technology Research Institute, Hsinchu (TW)

(72) Inventors: Jian-Lung Chen, Taoyuan (TW); Chih-Chia Chang, Hsinchu County (TW); Yu-Hsin Lin, Miaoli County (TW); Yu-Ju Chao, Hsinchu County (TW); Ting-Hsun Cheng, Chiayi County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 17/143,170

(22) Filed: Jan. 7, 2021

(65) Prior Publication Data

US 2021/0365662 A1 Nov. 25, 2021

(30) Foreign Application Priority Data

May 19, 2020 (TW) ................. 109116491

(51) Int. Cl.
*G06V 40/13* (2022.01)
*G06F 3/041* (2006.01)
*G06V 40/12* (2022.01)

(52) U.S. Cl.
CPC .......... *G06V 40/13* (2022.01); *G06F 3/041* (2013.01); *G06V 40/1347* (2022.01); *G06V 40/1365* (2022.01)

(58) Field of Classification Search
None
See application file for complete search history.

(56) References Cited

U.S. PATENT DOCUMENTS

| 7,542,594 | B2 | 6/2009 | Ikeda | |
|---|---|---|---|---|
| 2003/0091219 | A1* | 5/2003 | Martinez | ........... G06K 9/00026 382/124 |

(Continued)

FOREIGN PATENT DOCUMENTS

| CN | 101263511 | 1/2012 |
|---|---|---|
| CN | 108323206 | 7/2018 |

(Continued)

OTHER PUBLICATIONS

Jan Flusser et al., "Image Fusion: Principles, Methods, and Applications", Institute of Information Theory and Automation Academy of Sciences of the Czech Republic, 2007, pp. 1-60.

(Continued)

*Primary Examiner* — Joseph R Haley
(74) *Attorney, Agent, or Firm* — JCIPRNET

(57) ABSTRACT

A fingerprint recognition method is provided. The method includes obtaining a plurality of fingerprint images by sensing a finger of a user, respectively calculating geometric center points corresponding to the fingerprint images, and calculating positions and offsets of the fingerprint images according to the geometric center points. The method also includes filling signals in the fingerprint images into a part of pixels in a pixel array according to the positions and the offsets of the fingerprint images, and obtaining signals of other pixels in the pixel array by inputting the signals filled in the part of pixels in the pixel array into an artificial intelligence engine. The method further includes generating a candidate fingerprint image and recognizing a user based on the candidate fingerprint image.

20 Claims, 10 Drawing Sheets

(56) References Cited

U.S. PATENT DOCUMENTS

2010/0046810 A1* 2/2010 Yamada ................ G06T 3/4053
382/124
2016/0350574 A1* 12/2016 Weber ................ G06K 9/00026

FOREIGN PATENT DOCUMENTS

| | | |
|---|---|---|
| CN | 108345825 | 7/2018 |
| TW | I526943 | 3/2016 |
| TW | I633480 | 8/2018 |
| TW | I650712 | 2/2019 |
| TW | I666566 | 7/2019 |

OTHER PUBLICATIONS

Wonkuk Seo et al., "Transparent Fingerprint Sensor System for Large Flat Panel Display", Sensors, Jan. 19, 2018, pp. 1-10.
Kyung-Hoon Song et al., "A Method for Enhancing the Sensing Distance of a Fingerprint Sensor", Sensors, Oct. 7, 2017, pp. 1-10.
"Office Action of Taiwan Counterpart Application", dated Mar. 19, 2021, p. 1-p. 14.

* cited by examiner

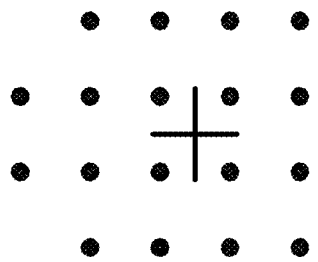
FIG. 6A
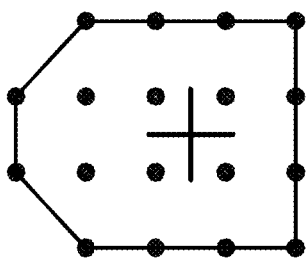
FIG. 6B
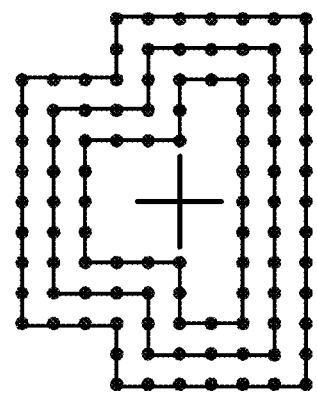
FIG. 6C
FIG. 6D

FINGERPRINT RECOGNITION METHOD AND ELECTRONIC INTERACTIVE APPARATUS THEREOF

CROSS-REFERENCE TO RELATED APPLICATION

This application claims the priority benefit of Taiwan application no. 109116491, filed on May 19, 2020. The entirety of the above-mentioned patent application is hereby incorporated by reference herein.

TECHNICAL FIELD

The disclosure relates to a fingerprint recognition method and an electronic interactive apparatus thereof.

BACKGROUND

With the rapid development of touch display and recognition technology, quite a few applications have been derived. For example, after an operator of a touch display is recognized, personalized interface and information may be provided on a touch screen.

At present, a touch display equipped with a fingerprint capturing device has been developed, which can recognize a user using the touch screen and provide a personalized interaction. In general, to be able to recognize fingerprints, a captured image needs to have high resolution of, for example, at least 500 dpi to 1200 dpi. However, in certain applications, high resolution fingerprint images cannot be captured. For example, a transparent display cannot be configured with sensors with such a high density in consideration of a transmission rate. Therefore, how to recognize the user based on the fingerprint image and provide the corresponding interaction and information without capturing high resolution images is the goal of those skilled in the art.

SUMMARY

According to an exemplary embodiment of the disclosure, a fingerprint recognition method is provided. The method includes detecting a touch signal corresponding to a user on a touch display, and sensing a finger of the user to obtain a plurality of fingerprint images through a fingerprint sensor disposed on the touch display, wherein the fingerprint sensor has a plurality of sensing units and the finger of the user moves on the sensing units. The method further includes respectively calculating geometric center points corresponding to the fingerprint images, and calculating positions and offsets of the fingerprint images according to the geometric center points. The method also includes filling signals in the fingerprint images into a part of pixels in a pixel array according to the positions and the offsets of the fingerprint images, and obtaining signals of other pixels in the pixel array by inputting the signals filled in the part of pixels in the pixel array into an artificial intelligence engine. The method further includes generating a candidate fingerprint image and recognizing a user based on the candidate fingerprint image.

According to an exemplary embodiment of the disclosure, an electronic interactive apparatus is provided and includes a processor, a touch display, a fingerprint sensor and a storage device. The touch display is coupled to the processor, and configured to detect a touch signal corresponding to a user. The fingerprint sensor is coupled to the processor, and configured to sense a finger of the user to obtain a plurality of fingerprint images, wherein the fingerprint sensor has a plurality of sensing units and the finger of the user moves on the sensing units. The storage device is coupled to the processor. Here, the fingerprint sensor respectively calculates geometric center points corresponding to the fingerprint images, and calculates positions and offsets of the fingerprint images according to the geometric center points corresponding to the fingerprint images. Further, the fingerprint sensor fills signals in the fingerprint images into a part of pixels in a pixel array according to the positions and the offsets of the fingerprint images, and obtains signals of other pixels in the pixel array by inputting the signals filled in the part of pixels in the pixel array into an artificial intelligence engine. Furthermore, the fingerprint sensor generates a candidate fingerprint image according to the pixel array. The processor recognizes the user according to the candidate fingerprint image.

BRIEF DESCRIPTION OF THE DRAWINGS

FIGS. 6A, 6B, 6C and 6D are schematic diagrams for calculating geometric center points illustrated according to an exemplary embodiment of the disclosure.

DETAILED DESCRIPTION

Figure 1:
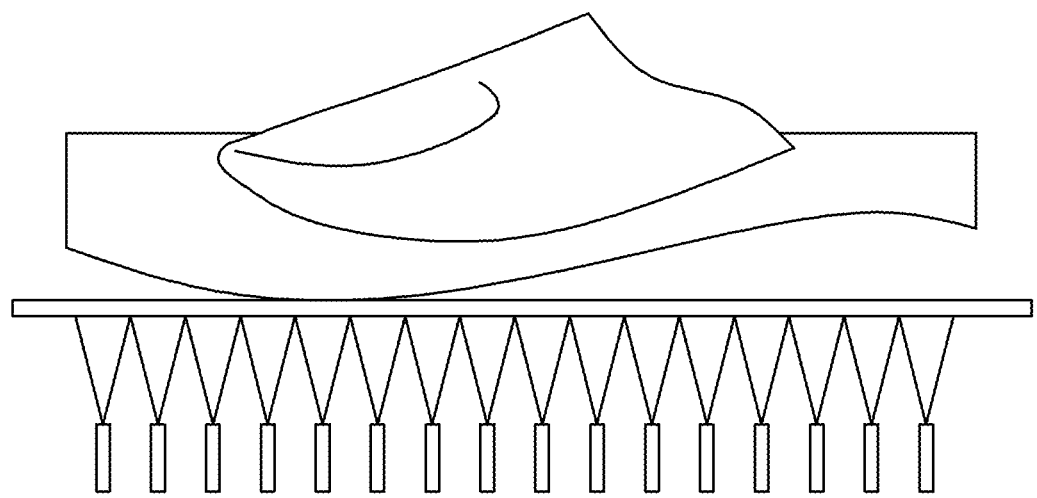
FIG. 1 is a schematic diagram for sensing fingerprints illustrated according to the conventional art.
Figure 2:
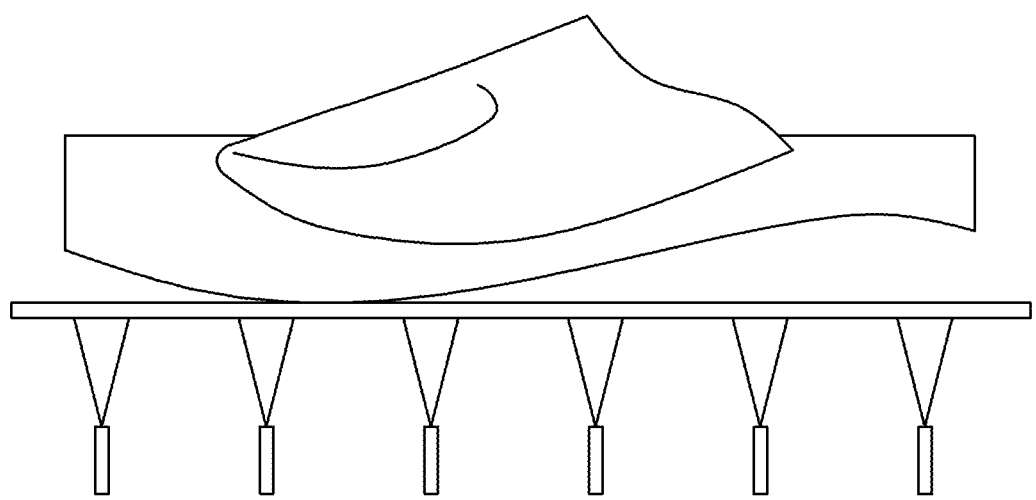
FIG. 2 is a schematic diagram for sensing fingerprints illustrated according to an exemplary embodiment of the disclosure.

FIG. 1 is a schematic diagram for sensing fingerprints illustrated according to the conventional art, and FIG. 2 is a schematic diagram for sensing fingerprints illustrated according to an exemplary embodiment of the disclosure. Referring to FIG. 1 and FIG. 2, in an example where a user recognizing function is implemented on devices such as a tablet computer, an interactive TV wall or the like, sensors are disposed under a display screen to sense a fingerprint of a user. As described above, in order to recognize the fingerprint, a captured image needs to have sufficient resolution. An object to be measured may be completely covered by using a detection range of the sensors having sufficient density (e.g., as shown in FIG. 1). However, in an application (e.g., a transparent display) of an exemplary embodiment of the disclosure, when the sensors are configured with a lower density in consideration of a transmission rate, a local area may be detected (as shown in FIG. 2).

Figure 3:
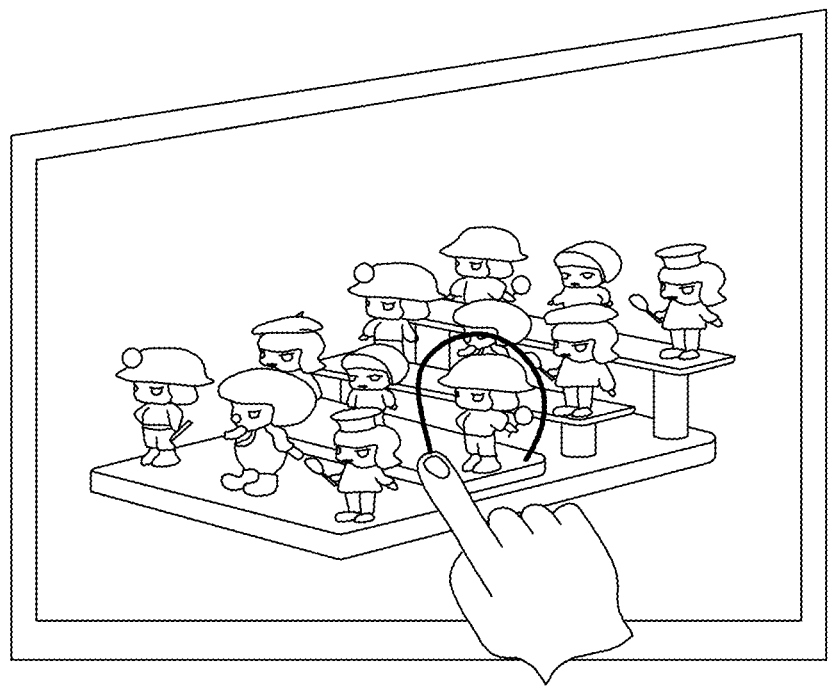
FIG. 3 is a schematic diagram of an interactive apparatus illustrated according to an exemplary embodiment of the disclosure.
Figure 4:
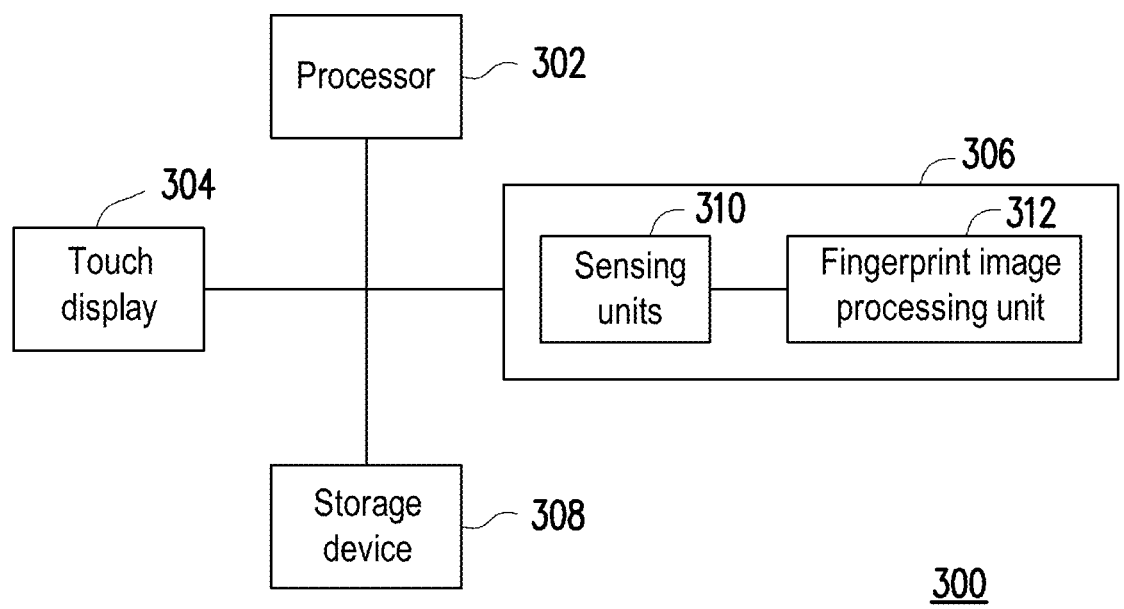
FIG. 4 is a block diagram of an interactive apparatus illustrated according to an exemplary embodiment of the disclosure.

FIG. 3 is a schematic diagram of an interactive apparatus illustrated according to an exemplary embodiment of the disclosure, and FIG. 4 is a block diagram of an interactive apparatus illustrated according to an exemplary embodiment of the disclosure.

Referring to FIG. 3 and FIG. 4, an electronic interactive apparatus 300 includes a processor 302, a touch display 304, a fingerprint sensor 306 and a storage device 308. The touch display 304, the fingerprint sensor 306 and the storage device 308 are coupled to the processor 302. The electronic interactive apparatus 300 is, for example, a mobile device, a personal digital assistant (PDA), a notebook computer, a tablet computer, a general desktop computer, an interactive display board, an interactive TV wall, an interactive transparent display board, or other electronic device, which is not limited herein.

The processor 302 may be, for example, a processor for general purposes, a processor for special purposes, a conventional processor, a data signal processor, a plurality of microprocessors, one or more microprocessors, controllers, microcontrollers and Application Specific Integrated Circuit (ASIC) which are combined to a core of the digital signal processor, a Field Programmable Gate Array (FPGA), any other integrated circuits, a state machine, a processor based on Advanced RISC Machine (ARM) and similar products.

The touch display 304 may be used to receive a touch signal and display a corresponding interface according to instructions from the processor 302. For example, the touch display 304 may be an LED display, a liquid crystal display, a transparent display, a flexible display or other suitable display types provided with touch control elements.

The fingerprint sensor 306 includes a plurality of sensing units 310 and a fingerprint image processing unit 312. The sensing units 310 may be arranged under the touch display 304 in an array manner (as shown in FIG. 2) to detect a fingerprint of the user. The fingerprint image processor unit 312 is coupled to the sensing units 310 and configured to generate a fingerprint image of the user.

The storage device 308 may be, for example, any fixed or movable device including a RAM (Random Access Memory), a ROM (Read-Only Memory), a flash memory, a hard drive or other similar devices or a combination of the above-mentioned devices. In this exemplary embodiment, the storage device 308 is configured to store a fingerprint image registered by the user, which may be used as a reference for recognizing the user in subsequent processes. In another exemplary embodiment, the storage device 308 is further stored with programs such as a computing module, a control module or the like, which may be operated by the processor 302 to perform a fingerprint recognition and execute a corresponding interactive interface.

In an exemplary embodiment of the disclosure, when the touch signal is detected, the electronic interactive apparatus 300 may obtain a plurality of low resolution fingerprint images, and generate a high resolution fingerprint image based on the low resolution fingerprint images. In addition, the electronic interactive apparatus 300 may recognize the user operating the electronic interactive apparatus 300 according to the high resolution fingerprint image to correspondingly output an interactive interface.

Figure 5:
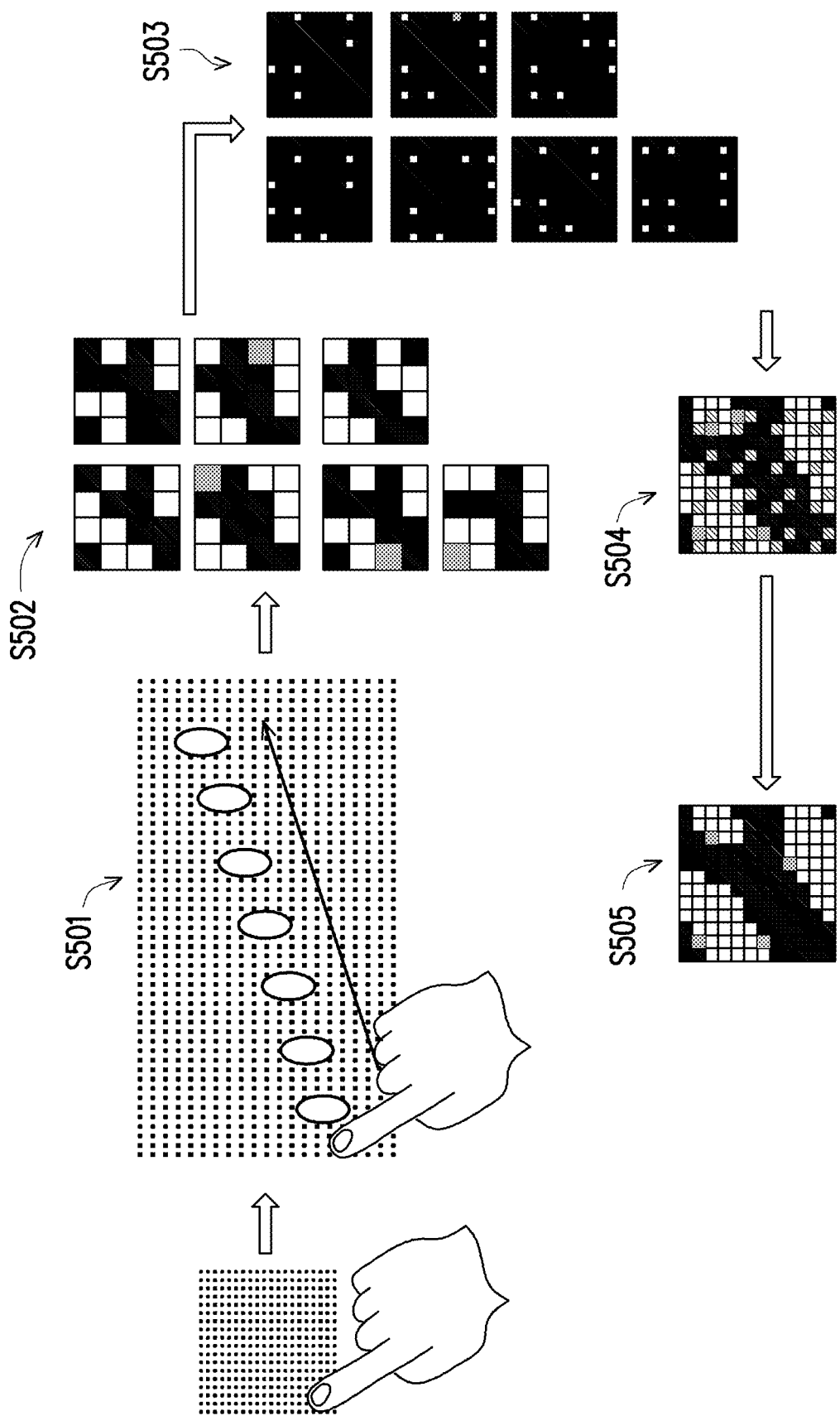
FIG. 5 is a schematic diagram for generating a high resolution fingerprint image illustrated according to an exemplary embodiment of the disclosure.

FIG. 5 is a schematic diagram for generating a high resolution fingerprint image illustrated according to an exemplary embodiment of the disclosure.

Referring to FIG. 5, when the finger of the user moves on the touch display 304 (S501), the touch display 304 may receive the touch signal, and the processor 302 may instruct the fingerprint sensor 306 to sense a fingerprint signal to obtain a plurality of low resolution fingerprint images (S502).

Next, the fingerprint image processing unit 312 may respectively calculate geometric center points of the low resolution fingerprint images. For example, after signals are received form the sensing units 310, the fingerprint image processing unit 312 determines the geometric center points of the fingerprint images according to all pixels having signals (as shown in FIG. 6A). However, the disclosure is not limited in this regard. After signals are received form the sensing units 310, the fingerprint image processing unit 312 may also determine the geometric center points of the fingerprint images according to a contour of all pixels having signals (as shown in FIG. 6A). For example, the contour of the pixels may be a straight line parallel or perpendicular to a pixel arrangement direction (as shown in FIG. 6B), or a diagonal line with a 45 degree angle to the pixel arrangement direction (as shown in FIG. 6C). Alternatively, the contour of the pixels may be multi-layered (as shown in FIG. 6D).

Figure 7:
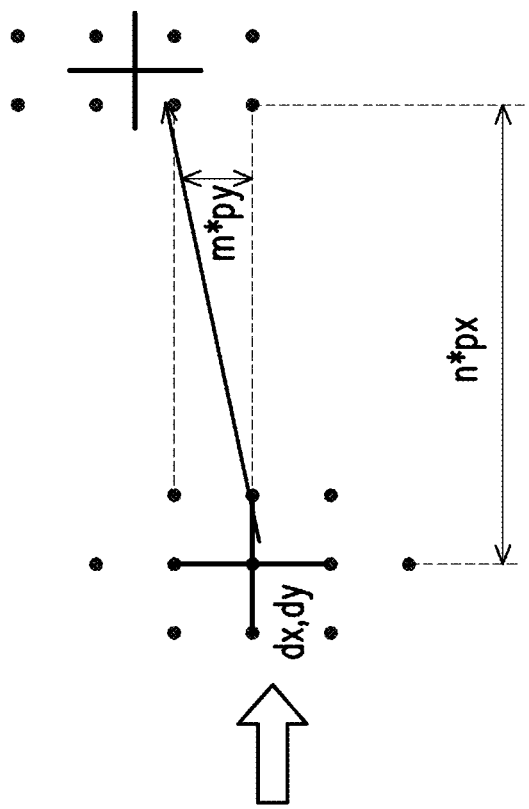
FIG. 7 is a schematic diagram for calculating offsets illustrated according to an exemplary embodiment of the disclosure.
Figure 7:
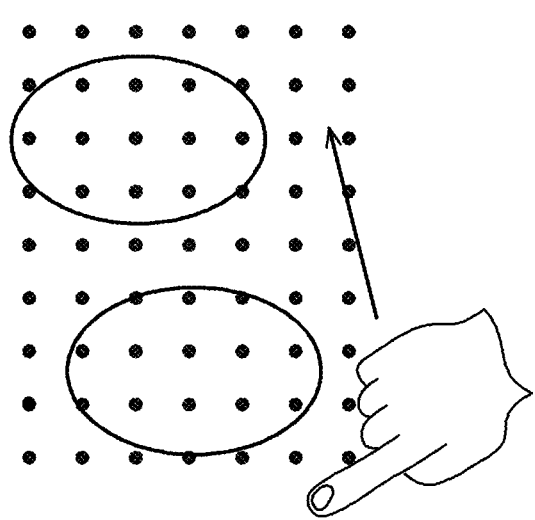

After the geometric center points of the low resolution fingerprint images are obtained, the fingerprint image processing unit 312 may calculate a position of each of the low resolution fingerprint images and an offset thereof from the first low resolution fingerprint image according to these geometric center points. For example, it is assumed that, according to the geometric center point, the offset from the first low-resolution fingerprint image is calculated as d and horizontal and vertical distances between the sensing units 310 are px and py, respectively. Accordingly, a horizontal offset BiasX and a vertical offset BiasY may be expressed as follows:

$$\text{Bias}x = dx - n*px$$

$$\text{Bias}y = dy - m*py$$

wherein m and n are integers, $0 \leq \text{Bias}x < px$, and $0 \leq \text{Bias}y < py$ (as shown in FIG. 7).

Figure 8:
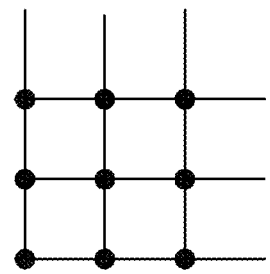
FIG. 8 is a schematic diagram for filling pixels illustrated according to an exemplary embodiment of the disclosure.
Figure 8:
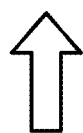
Figure 8:
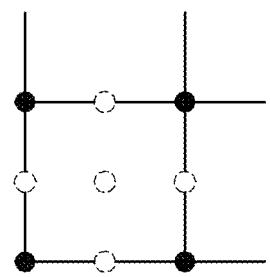
Figure 8:
Figure 8:
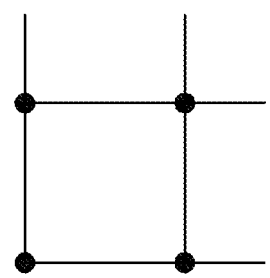

Then, the fingerprint image processing unit 312 fills signals in the low resolution fingerprint images into one high pixel array according to the positions and the offsets of the low resolution fingerprint images (S503). The fingerprint image processing unit 312 uses other low resolution signals (as shown in the left of FIG. 8) to perform a signal filling (as shown in the middle of FIG. 8) to form a high resolution signal (as shown in the right of FIG. 8). In particular, in an exemplary embodiment, after the signals of a part of pixels in the high pixel array are obtained from the low resolution fingerprint image, the fingerprint image processing unit 312 inputs the obtained signals of the pixels into an artificial intelligence engine to generate signals of other pixels in the high pixel array (S504). For example, in this exemplary embodiment, the artificial intelligence engine may be implemented by using an enhanced deep super resolution architecture, a super resolution convolutional neural network or other suitable artificial intelligence engines. Lastly, the fingerprint image processing unit 312 outputs the high resolution fingerprint image according to the signals in the generated high pixel array (S505).

In an exemplary embodiment, during the process of signal filling, the fingerprint image processing unit 312 may continuously determine whether a filled signal quantity is sufficient for the artificial intelligence engine to obtain a new and different image. If the filled signal quantity is insufficient, the fingerprint image processing unit 312 obtains the fingerprint images from the sensing units 310 again.

For example, the fingerprint image processing unit 312 may calculate and obtain a fitting curve according to the geometric center points of the obtained low resolution fingerprint images, and calculate a length L1 of the fitting curve, In this exemplary embodiment, the obtained fitting curve may pass through to the geometric center point of the last low resolution fingerprint image, and uses the geometric center point of the last low resolution fingerprint image as an end point. However, the disclosure is not limited in this regard. It is also possible that the fitting curve does not pass through to the geometric center point of the last low resolution fingerprint image, and instead, the finger image processing unit 312 may select a point on the fitting curve closest to the geometric center point of the last low resolution fingerprint image as the end point. Furthermore, the fingerprint image processing unit 312 may also select a point on the fitting curve that is away from the geometric center point of the last low resolution fingerprint image in a vertical line direction or a horizontal line direction as the end point. Similarly, when the fitting curve passes through the geometric center point of the first low resolution fingerprint image, the geometric center point of the first low resolution fingerprint image may be used as a start point of the fitting curve; if the fitting curve does not pass through the geometric center point of the first low resolution fingerprint image, the fingerprint image processing unit 312 may select a point on the fitting curve closest to the geometric center point of the first low resolution fingerprint image as the start point of the fitting curve. Furthermore, the fingerprint image processing unit 312 may also select a point on the fitting curve that is away from the geometric center point of the first low resolution fingerprint image in the vertical line direction or the horizontal line direction as the end point.

Further, the fingerprint image processing unit 312 may calculate and obtain an extended fitting curve from the end point of the fitting curve to an edge of the fingerprint sensor 306, and calculate a length L2 of the extended fitting curve.

When the length L1 of the fitting curve is less than the length L2 of the extended fitting curve, the fingerprint image processing unit 312 may determine that the filled signal quantity is insufficient. When the length L1 of the fitting curve is not less than the length L2 of the extended fitting curve, according to the length L2 of the extended fitting curve, the fingerprint image processing unit 312 may search backward from the end point of the fitting curve along the fitting curve by a length L2R equal to the extended fitting curve, and the fingerprint image processing unit 312 may determine that the filled signal quantity is insufficient when a point of a new and different image is found in that way.

For the convenience of explanation, it is simplified here that the length L2 is equal to the length L2R. In fact, at each stage, a probability of obtaining a different image is not the same, and the probability becomes lower in later stages. For example, in a sensing array with a resolution of 170 dpi, to perform a 3×3 image restoration, a total of nine different images need to be obtained. If two different images are already obtained, the probability that the next image is different from the previous two images is 78% (=(9/2)/9). If seven different images are already obtained, the probability of the next image is different from the previous seven images is 22% ((9-7)/9). In other words, as the probability of obtaining an (N+1)th different image is lower than the probability of obtaining an Nth different image, the length L2R is estimated to be smaller than the length L2. Therefore, when the resolution of the sensing array is designed to be R dpi, the obtained low resolution images need to be restored to $R_0$ dpi. On that basis, if N different images are already obtained, a ratio relationship of the length L2 and the length L2R is as follows:

$$L2R = \frac{R_0 \times R_0 - R \times R \times (N-1)}{R_0 \times R_0 - R \times R \times N} \times L2$$

Among them, L2<L2R≤2 (L2), and when $R_0$ is 508, L2R/L2 may refer to the following table:

| N | Resolution 254 dpi | N | Resolution 170 dpi | N | Resolution 127 dpi | N | Resolution 101 dpi |
|---|---|---|---|---|---|---|---|
| : | : | 2 | 1.14 | 9 | 1.14 | 18 | 1.14 |
| : | : | 3 | 1.16 | 10 | 1.16 | 19 | 1.16 |
| : | : | 4 | 1.2 | 11 | 1.2 | 20 | 1.2 |
| : | : | 5 | 1.25 | 12 | 1.25 | 21 | 1.25 |
| 1 | 1.33 | 6 | 1.33 | 13 | 1.33 | 22 | 1.33 |
| 2 | 1.5 | 7 | 1.5 | 14 | 1.5 | 23 | 1.5 |
| 3 | 2 | 8 | 2 | 15 | 2 | 24 | 2 |

It should be understood that the above method for determining whether the filled signal quantity is insufficient is only an exemplary embodiment, and the disclosure is not limited thereto.

In this exemplary embodiment, a trajectory of the finger of the user moving on the touch display 304 may be a closed line segment or an unclosed line segment such as circle, ellipse, square, polygon, line, arc, parabola, polygon, etc., which are not particularly limited by the disclosure. It should be that be noted that, the finger of the user needs to move on the touch display 304 by a certain length so that the fingerprint image processing unit 312 can receive sufficient signals from the sensing unit 310 to facilitate output of the high resolution fingerprint image. In general, a finger movement speed is, for example, 11.3 cm per second. If an imaging frequency is 30 Hz, the finger movement length needs to meet the following formula: Length (cm)≥((2*508/dpi)$^2$)/f, wherein dpi is a density of the sensing units and f is a frame rate. The finger movement length needs be greater than 22 mm if a 2×2 pixel array is used for restoration, and needs be greater than 68 mm if a 3×3 pixel array is used for restoration.

In this exemplary embodiment, the fingerprint image processing unit 312 calculates predicted pixel signals after the finger of the user stops moving. In addition, in another exemplary embodiment, the fingerprint image processing unit 312 may also make multiple predictions based on the received signals while the finger of the user is moving. In this way, as more signals are received when the finger movement length of the user becomes longer, a prediction precision may be higher.

In this exemplary embodiment, the processor 302 may recognize the user operating the electronic interactive apparatus 300 according to the high resolution fingerprint image recognized by the fingerprint image processing unit 312 and the fingerprint image recorded by the storage device 308. For example, when no fingerprint image is recorded in the storage device 308, the high resolution fingerprint image recognized by the fingerprint image processing unit 312 is then recorded in the storage device 308. Later, when the fingerprint image sensed by the fingerprint image processing unit 312 is identical to the fingerprint image recorded in the storage device 308, the processor 302 may successfully recognize the user operating the electronic interactive apparatus 300 and provide a corresponding processing mechanism. Further, when no other touch signal of the same user is received for a period of time, the processor 302 deletes the fingerprint image of that user from the storage device 308.

For example, in an exemplary embodiment where the electronic interactive apparatus 300 can receive one user operation at the same time, when the touch display 304 receives the touch signal, the processor 302 may record the high resolution fingerprint image generated by the fingerprint image processing unit 312 into the storage device 308. Later, when the touch display 304 receives another touch signal, the processor 302 may compare a high resolution fingerprint image newly generated by the fingerprint image processing unit 312 with the fingerprint image in the storage device 308. If the newly generated high resolution fingerprint image is different from the fingerprint image in the storage device 308, the processor 302 stops processing that touch signal. Based on this, the processor 302 deletes the fingerprint image of that user from the storage device 308 when no other touch signal of the same user is received for a period of time. Accordingly, another user may register a fingerprint image to operate the electronic interactive apparatus 300.

Figure 9:
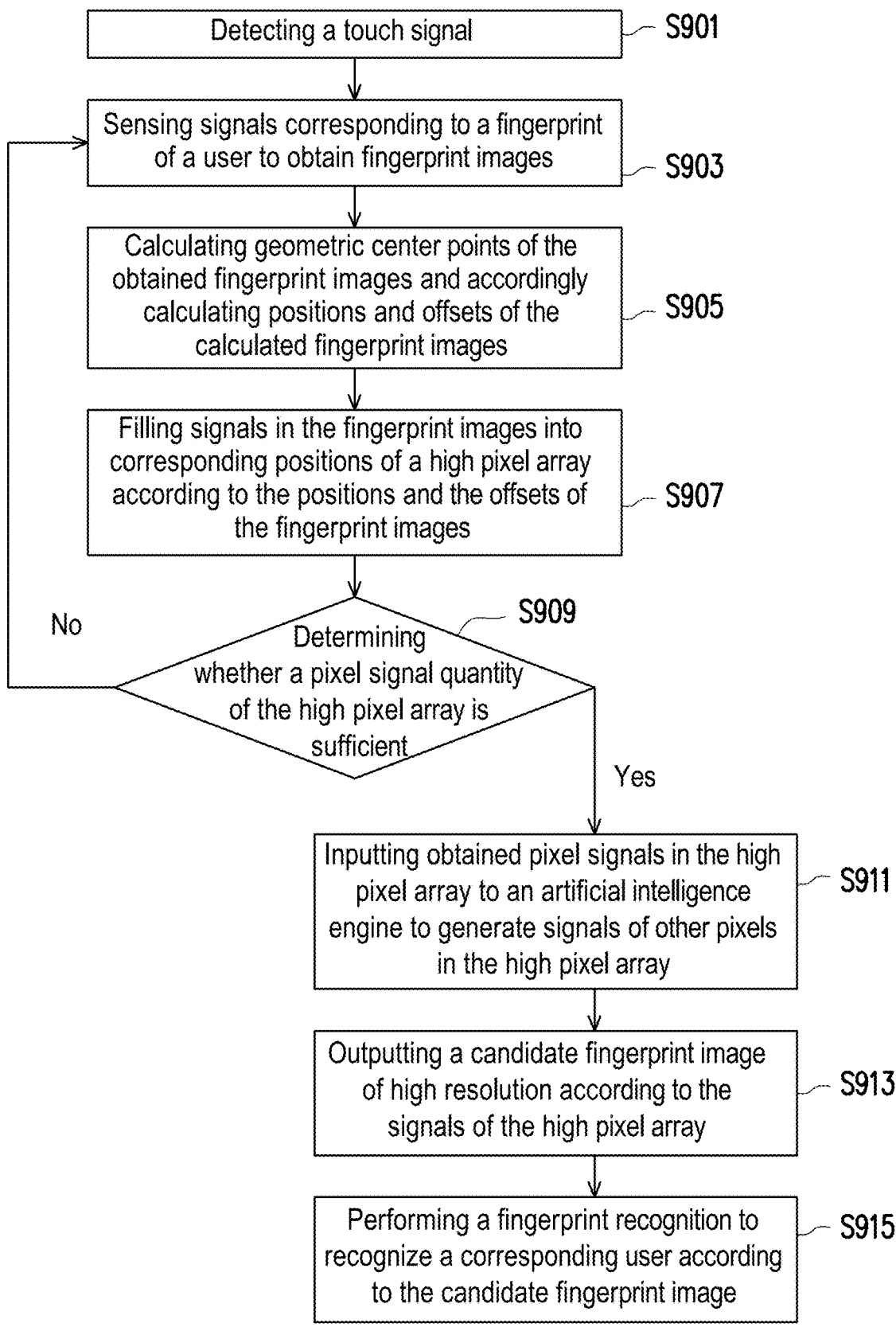
FIG. 9 is a flowchart of a fingerprint recognition method illustrated according to an exemplary embodiment of the disclosure.

FIG. 9 is a flowchart of a fingerprint recognition method illustrated according to an exemplary embodiment of the disclosure.

Referring to FIG. 9, in step S901, the touch display 304 detects a touch signal.

In step S903, the fingerprint sensor 306 (or the sensing units 310) may sense signals corresponding to a fingerprint of a user to obtain fingerprint images (e.g., first fingerprint images).

In step S905, the fingerprint sensor 306 (or the fingerprint image processing unit 312) may calculate geometric center points of the obtained fingerprint images and accordingly calculate positions and offsets of the calculated fingerprint images.

In step S907, the fingerprint sensor 306 (or the fingerprint image processing unit 312) may fill signals in the fingerprint images into corresponding positions of a high pixel array according to the positions and the offsets of the fingerprint images.

In step S909, the fingerprint sensor 306 (or the fingerprint image processing unit 312) may determine whether a pixel signal quantity of the high pixel array is sufficient.

If the pixel signal quantity of the high pixel array is insufficient, step S903 is executed to continue obtaining the fingerprint images.

If the pixel signal quantity of the high pixel array is sufficient, in step S911, the fingerprint sensor 306 inputs obtained pixel signals in the high pixel array into an artificial intelligence engine to generate signals of other pixels in the high pixel array.

Next, in step S913, the fingerprint sensor 306 outputs a candidate fingerprint image of high resolution according to the signals of the high pixel array.

Then, in step S915, the processor 302 performs a fingerprint recognition to recognize a corresponding user according to the candidate fingerprint image. Here, the fingerprint recognition includes procedures such as calculating a fingerprint orientation, performing an image binarization, performing a line thinning, extracting features and performing comparison.

Figure 10:
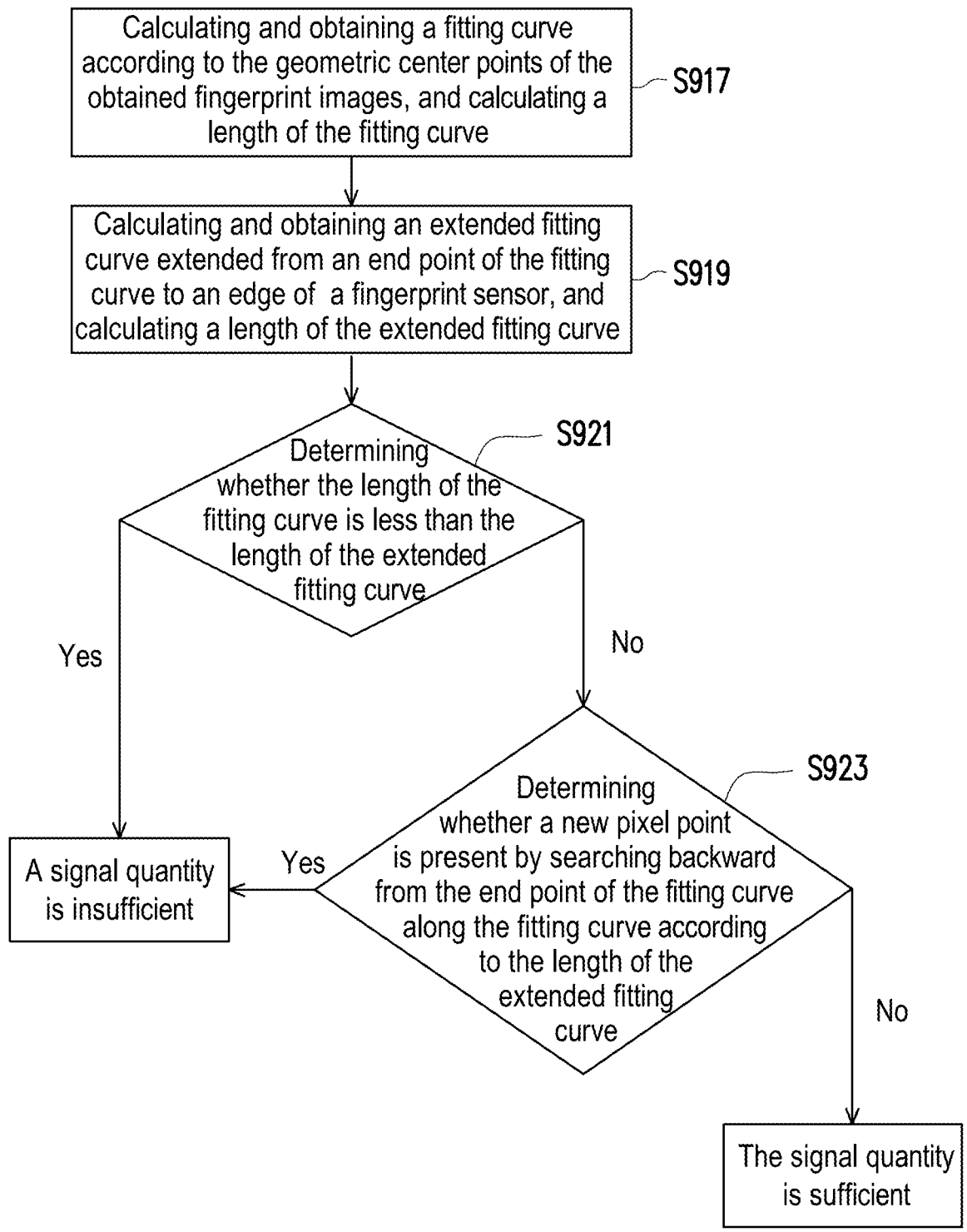
FIG. 10 is a flowchart of detailed steps for determining whether a pixel signal quantity of a pixel array is sufficient in FIG. 9 illustrated according to an exemplary embodiment of the disclosure.

FIG. 10 is a flowchart of detailed steps for determining whether a pixel signal quantity of a pixel array is sufficient in FIG. 9 illustrated according to an exemplary embodiment of the disclosure.

Referring to FIG. 10, in step S917, the fingerprint sensor 306 (or the fingerprint image processing unit 312) calculates and obtains a fitting curve according to the geometric center points of the obtained fingerprint images, and calculates a length of the fitting curve.

In step S919, the fingerprint sensor 306 (or the fingerprint image processing unit 312) calculates and obtains an extended fitting curve extended from an end point of the fitting curve to an edge of the fingerprint sensor 306 (or the fingerprint image processing unit 312), and calculates a length of the extended fitting curve.

In step S921, the fingerprint sensor 306 (or the fingerprint image processing unit 312) may determine whether the length of the fitting curve is less than the length of the extended fitting curve.

If the length of the fitting curve is less than the length of the extended fitting curve, the fingerprint sensor 306 (or the fingerprint image processing unit 312) may determine that the filled signal quantity is insufficient.

If the length of the fitting curve is not less than the length of the extended fitting curve, in step S923, the fingerprint sensor 306 (or the fingerprint image processing unit 312) determines whether a new pixel point is present by searching backward from the end point of the fitting curve along the fitting curve according to the length of the extended fitting curve.

If the new pixel point is present, the fingerprint sensor 306 (or the fingerprint image processing unit 312) may determine that the filled signal quantity is insufficient.

If the new pixel point is absent, the fingerprint sensor 306 (or the fingerprint image processing unit 312) may determine that the filled signal quantity is sufficient.

Figure 11:
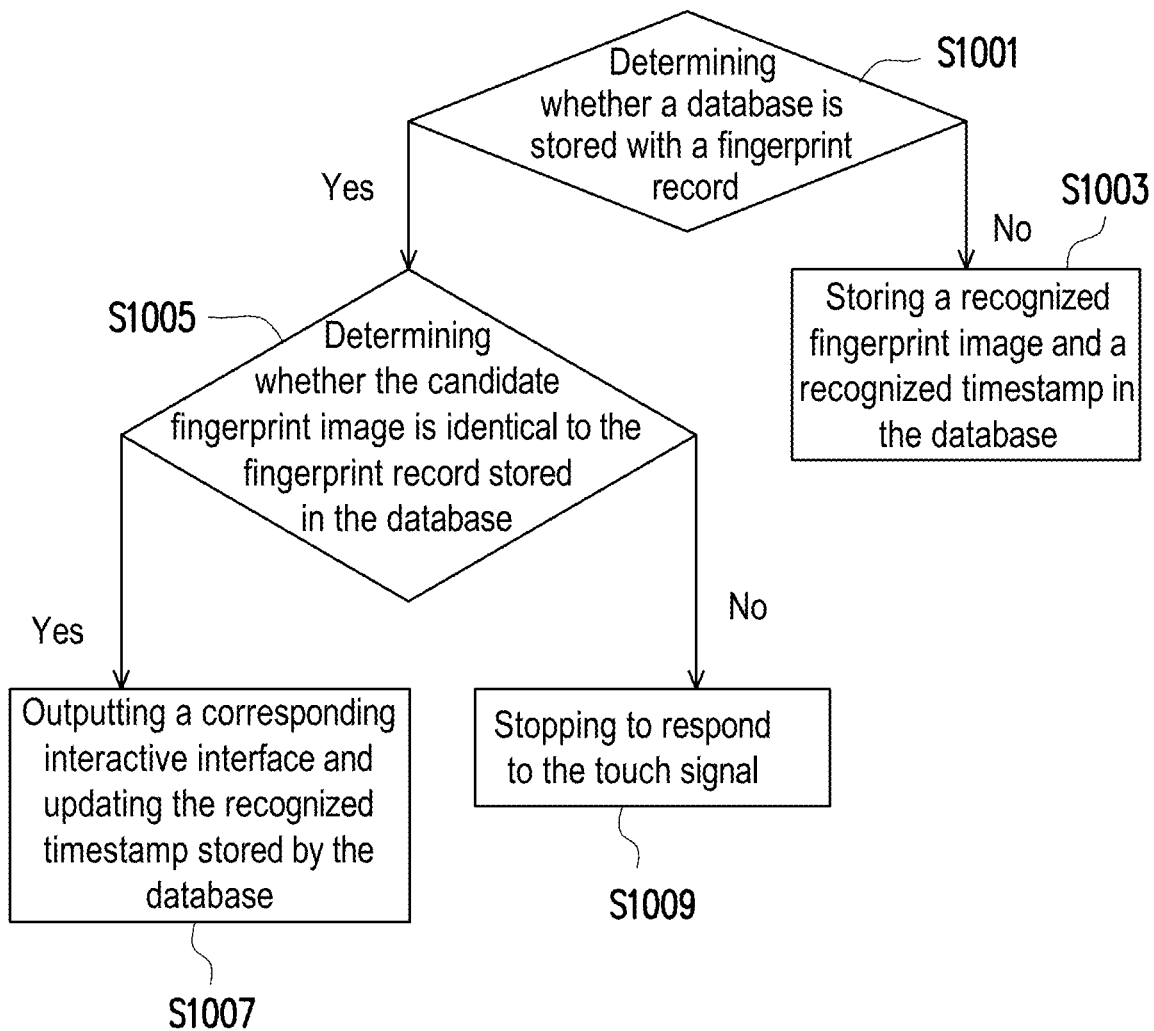
FIG. 11 is a flowchart for performing a fingerprint recognition to recognize a corresponding user illustrated according to an exemplary embodiment of the disclosure.

FIG. 11 is a flowchart for performing a fingerprint recognition to recognize a corresponding user illustrated according to an exemplary embodiment of the disclosure.

Referring to FIG. 11, in step S1001, the processor 302 may determine whether a database in the storage device 308 is stored with a fingerprint record.

If the database is not stored with the fingerprint record, in step S1003, the processor 302 may store the recognized fingerprint image and a recognized timestamp in the database. Subsequently, the processor 302 may process new fingerprint images (e.g., second fingerprint images) as described above.

If the database is stored with the fingerprint record, in step S1005, the processor 302 may determine whether the candidate fingerprint image is identical to the fingerprint record stored in the database.

If the candidate fingerprint image is identical to the fingerprint record stored in the database, in step S1007, the processor 302 may output a corresponding interactive interface and update the recognized timestamp stored by the database.

If the candidate fingerprint image is not identical to the fingerprint record stored in the database, in step S1009, the processor 302 may stop to respond to the touch signal.

In another exemplary embodiment, the sensing units 310 may be disposed on a once-stretchable substrate. The once-stretchable substrate may be made by stretchable or shrinkable materials (e.g., Ethylene Vinyl Acetate (EVA), Polyvinyl Chloride (PVC), Polyethylene (PE), Polytetrafluoroethylene (PTFE), Polyvinylidene Difluoride (PVDF), Ethylene Propylene Diene Monomer rubber (EPDM), etc). In the exemplary embodiment in which the sensing units 310 are disposed on a once-stretchable substrate, the electronic interactive apparatus 300 may further include a strain detector (not shown) coupled to the processor 302 to measure the strain amount of the once-stretchable substrate. And, the processor 302 obtain distances between the sensing units 310 according to the strain amount of the once-stretchable substrate and determines whether a new pixel point (i.e., deformed pixel) is needed to complement after the once-stretchable substrate is stretched. For example, when the stretch rate is 20%, a new pixel point is added every five pixel points. When the stretch rate is 25%, a new pixel point is added every four pixel points. When the stretch rate is 34%, a new pixel point is added every tree pixel points. Herein, the stretch rate is less than 50%. In addition, when the fingerprint sensor 306 inputs the obtained signals in the high pixel array into the artificial intelligence engine, a signal of the deformed pixel may be calculated.

In the exemplary embodiment, for example, the once-stretchable substrate may be transparent or non-transparent. The strain detector may be a commercially available metal foil strain gauge, or made of poly-silicon, or made of Single-Walled Carbon Nanotube (SWCNT). Additionally, the distances between the sensing units 310 may be converted into a retrievable voltage signal by a Wheatstone bridge or Quarter bridge.

Figure 12:
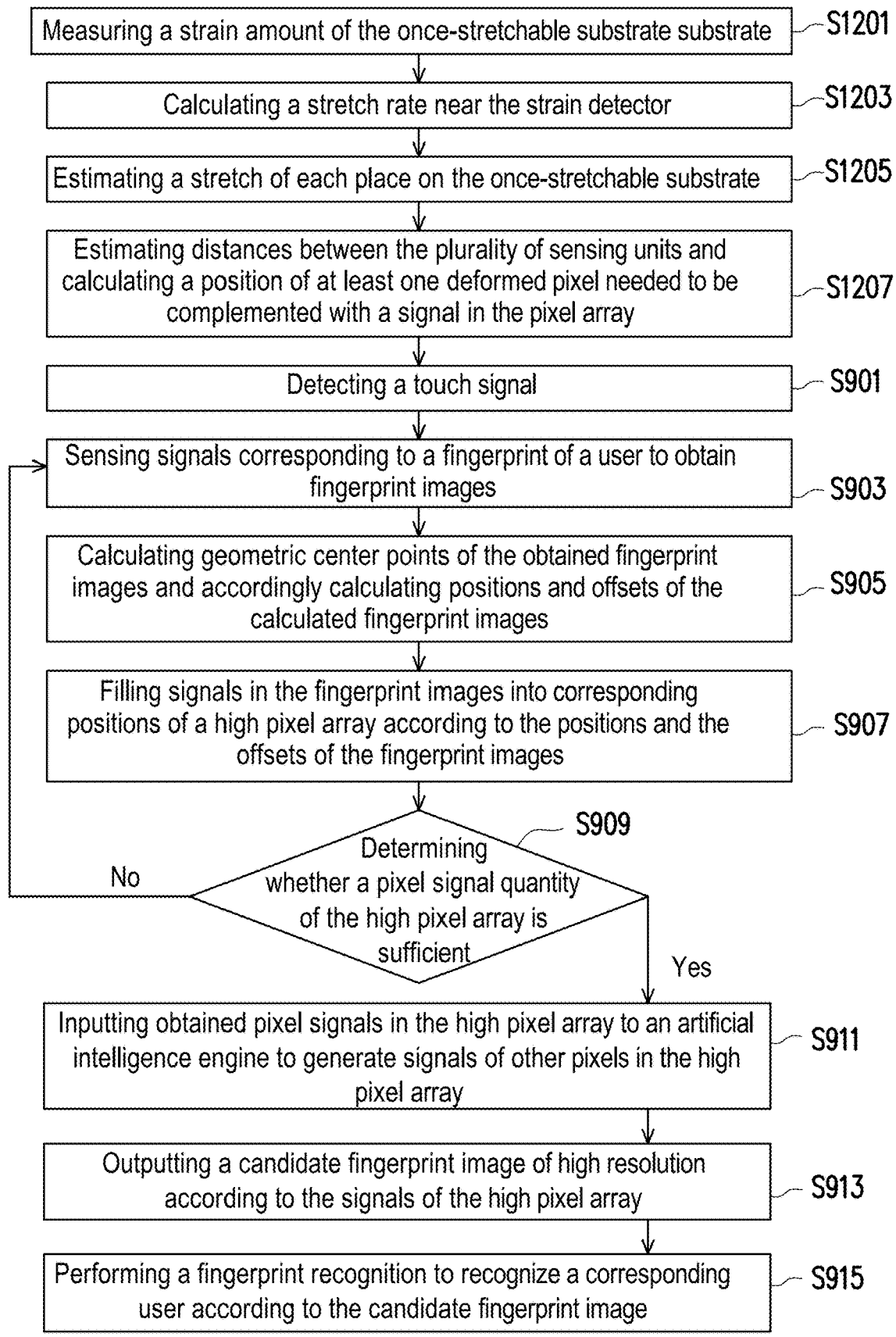
FIG. 12 is a flowchart of a fingerprint recognition method illustrated according to another exemplary embodiment of the disclosure.

FIG. 12 is a flowchart of a fingerprint recognition method illustrated according to another exemplary embodiment of the disclosure.

Referring to FIG. 12, in step S1201, the strain detector measures a strain amount of the once-stretchable substrate.

In step S1203, the processor 302 calculates a stretch rate near the strain detector.

In step S1205, the process 302 estimates a stretch of each place on the once-stretchable substrate.

In step S1207, the processor 302 estimates distances between the plurality of sensing units, and calculates a position of at least one deformed pixel needed to be complemented with a signal in the pixel array. After that, the steps S901~S915 are performed to sense touch signals and execute the fingerprint recognition to recognize a corresponding user.

The fingerprint recognition method and the apparatus thereof according to the exemplary embodiments of the disclosure can use the low resolution fingerprint images and the artificial intelligence engine to generate the high resolution fingerprint image. As a result, the interactive device equipped with low density fingerprint sensing units can use the high resolution fingerprint image to recognize the user and accurately provide the corresponding interactive content.

Although the disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

The invention claimed is:
1. A fingerprint recognition method, comprising:
    detecting a touch signal corresponding to a user on a touch display;
    sensing a finger of the user to obtain a plurality of fingerprint images through a fingerprint sensor disposed on the touch display, wherein the fingerprint sensor has a plurality of sensing units and the finger of the user moves on the sensing units;
    respectively calculating geometric center points corresponding to the fingerprint images;
    calculating positions and offsets of the fingerprint images according to the geometric center points corresponding to the fingerprint images;
    filling signals in the fingerprint images into a part of pixels in a pixel array according to the positions and the offsets of the fingerprint images;
    determining whether a signal quantity of the pixel array is sufficient;
    if the signal quantity of the pixel array is sufficient, obtaining signals of other pixels in the pixel array by inputting the signals filled in the part of pixels in the pixel array into an artificial intelligence engine;
    generating a candidate fingerprint image according to the pixel array; and
    recognizing the user according to the candidate fingerprint image.

2. The fingerprint recognition method of claim 1, wherein a trajectory of the finger of the user moving on the sensing units is a closed line segment or an unclosed line segment.

3. The fingerprint recognition method of claim 1, wherein the step of respectively calculating the geometric center points corresponding to the fingerprint images comprises:
    recognizing pixel points having the signals in each of the fingerprint images; and
    calculating the geometric center points of the fingerprint images according to the pixel points having the signals in each of the fingerprint images.

4. The fingerprint recognition method of claim 1, wherein the step of respectively calculating the geometric center points corresponding to the fingerprint images comprises:
    recognizing pixel points having the signals in each of the fingerprint images; and
    calculating the geometric center points of the fingerprint images according to a contour of the pixel points having the signals in each of the fingerprint images.

5. The fingerprint recognition method of claim 1, further comprising:
    storing the candidate fingerprint image and a timestamp corresponding to the candidate fingerprint image in a database.

6. The fingerprint recognition method of claim 5, further comprising:
    detecting another touch signal on the touch display;
    sensing a plurality of second fingerprint images through the fingerprint sensor;
    respectively calculating geometric center points corresponding to the second fingerprint images;
    calculating positions and offsets of the second fingerprint images according to the geometric center points corresponding to the second fingerprint images;
    filling signals in the second fingerprint images into a part of pixels in a second pixel array according to the positions and the offsets of the second fingerprint images;
    obtaining signals of other pixels in the second pixel array by inputting the signals filled in the part of pixels in the second pixel array into the artificial intelligence engine;
    generating a second candidate fingerprint image according to the second pixel array;
    comparing whether the second candidate fingerprint image is identical to the candidate fingerprint image stored by the database; and if the second candidate fingerprint image is not identical to the candidate fingerprint image, stopping to respond to the another touch signal.

7. The fingerprint recognition method of claim 6, further comprising:
when no other touch signal corresponding to the user is received for a period of time, clearing the recorded candidate fingerprint image from the database.

8. The fingerprint recognition method of claim 1, further comprising:
if the signal quantity of the pixel array is insufficient, sensing other fingerprint images corresponding to the finger of the user through the fingerprint sensor disposed on the touch display.

9. The fingerprint recognition method of claim 8, wherein the step of determining whether the signal quantity of the pixel array is sufficient comprises:
calculating and obtaining a fitting curve according to the geometric center points of the fingerprint images, and calculating a length of the fitting curve;
calculating and obtaining an extended fitting curve extended from an end point of the fitting curve to an edge of the fingerprint sensor, and calculating a length of the extended fitting curve;
if the length of the fitting curve is less than the length of the extended fitting curve, determining that the signal quantity of the pixel array is insufficient;
if the length of the fitting curve is not less than the length of the extended fitting curve, determining whether a new pixel point is present by searching backward from the end point of the fitting curve along the fitting curve according to the length of the extended fitting curve;
if the new pixel point is present, determining that the signal quantity of the pixel array is insufficient; and
if the new pixel point is absent, determining that the signal quantity of the pixel array is sufficient.

10. The fingerprint recognition method of claim 1, wherein the plurality of sensing units disposed on a once-stretchable substrate having a strain detector, and the method further comprises, before the step of detecting the touch signal corresponding to the user on the touch display,
calculating a stretch rate near the strain detector;
estimating a stretch of each place on the once-stretchable substrate;
estimating distances between the plurality of sensing units; and
calculating a position of at least one deformed pixel needed to be complement with a signal in the pixel array,
wherein the other pixels include the at least one deformed pixel.

11. An electronic interactive apparatus, comprising:
a processor;
a touch display, coupled to the processor, and configured to detect a touch signal corresponding to a user;
a fingerprint sensor, coupled to the processor, and configured to sense a finger of the user to obtain a plurality of fingerprint images, wherein the fingerprint sensor has a plurality of sensing units and the finger of the user moves on the sensing units; and
a storage device, coupled to the processor,
wherein the fingerprint sensor respectively calculates geometric center points corresponding to the fingerprint images, and calculates positions and offsets of the fingerprint images according to the geometric center points corresponding to the fingerprint images,
wherein the fingerprint sensor is further configured to determine whether a signal quantity of the pixel array is sufficient, if the signal quantity of the pixel array sufficient, the fingerprint sensor fills signals in the fingerprint images into a part of pixels in a pixel array according to the positions and the offsets of the fingerprint images, and obtains signals of other pixels in the pixel array by inputting the signals filled in the part of pixels in the pixel array into an artificial intelligence engine,
wherein the fingerprint sensor generates a candidate fingerprint image according to the pixel array,
wherein the processor recognizes the user according to the candidate fingerprint image.

12. The electronic interactive apparatus of claim 11, wherein a trajectory of the finger of the user moving on the sensing units is a closed line segment or an unclosed line segment.

13. The electronic interactive apparatus of claim 11, wherein the fingerprint sensor recognizes pixel points having the signals in each of the fingerprint images, and calculates the geometric center points of the fingerprint images according to the pixel points having the signals in each of the fingerprint images.

14. The electronic interactive apparatus of claim 11, wherein the fingerprint sensor recognizes pixel points having the signals in each of the fingerprint images, and calculates the geometric center points of the fingerprint images according to a contour of the pixel points having the signals in each of the fingerprint images.

15. The electronic interactive apparatus of claim 11, wherein the storage device stores a database, wherein the processor stores the candidate fingerprint image and a timestamp corresponding to the candidate fingerprint image in the database.

16. The electronic interactive apparatus of claim 15, wherein the touch display detects another touch signals,
wherein the fingerprint sensor senses a plurality of second fingerprint images, respectively calculates geometric center points corresponding to the second fingerprint images, and calculates positions and offsets of the second fingerprint images according to the geometric center points corresponding to the second fingerprint images,
wherein the fingerprint sensor fills signals in the second fingerprint images into a part of pixels in a second pixel array according to the positions and the offsets of the second fingerprint images, and obtains signals of other pixels in the second pixel array by inputting the signals filled in the part of pixels in the second pixel array into the artificial intelligence engine,
wherein the fingerprint sensor generates a second candidate fingerprint image according to the second pixel array,
wherein the processor compares whether the second candidate fingerprint image is identical to the candidate fingerprint image stored by the database, and
if the second candidate fingerprint image is not identical to the candidate fingerprint image, the processor stops to respond to the another touch signal.

17. The electronic interactive apparatus of claim 16, wherein when no other touch signal corresponding to the user is received by the touch display for a period of time, the processor clears the recorded candidate fingerprint image from the database.

18. The electronic interactive apparatus of claim 11, wherein if the signal quantity of the pixel array is insufficient, the fingerprint sensor senses other fingerprint images corresponding to the finger of the user.

19. The electronic interactive apparatus of claim 18, wherein
the fingerprint sensor is further configured to calculate and obtain a fitting curve according to the geometric center points of the fingerprint images, and calculate a length of the fitting curve,
the fingerprint sensor is further configured to calculate and obtain an extended fitting curve extended from an end point of the fitting curve to an edge of the fingerprint sensor, and calculate a length of the extended fitting curve;
if the length of the fitting curve is less than the length of the extended fitting curve, the fingerprint sensor determines that the signal quantity of the pixel array is insufficient,
if the length of the fitting curve is not less than the length of the extended fitting curve, the fingerprint sensor determines whether a new pixel point is present by searching backward from the end point of the fitting curve along the fitting curve according to the length of the extended fitting curve,
if the new pixel point is present, the fingerprint sensor determines that the signal quantity of the pixel array is insufficient, and
if the new pixel point is absent, the fingerprint sensor determines that the signal quantity of the pixel array is sufficient.

20. The electronic interactive apparatus of claim 11, further comprising:
a strain detector, coupled to the processor, wherein the plurality of sensing units and the strain detector disposed on a once-stretchable substrate,
wherein the strain detector is configured to measure a strain amount of the once-stretchable substrate,
wherein the processor, based on the strain amount of the once-stretchable substrate, calculates a stretch rate near the strain detector, estimates a stretch of each place on the once-stretchable substrate, estimates distances between the plurality of sensing units, and calculates a position of at least one deformed pixel needed to be complemented with a signal in the pixel array, wherein the other pixels include the at least one deformed pixel.

* * * * *